United States Patent
Sung et al.

(10) Patent No.: US 8,121,730 B2
(45) Date of Patent: *Feb. 21, 2012

(54) OBSTACLE DETECTION DEVICE OF AUTONOMOUS MOBILE SYSTEM

(75) Inventors: Yann-Shuoh Sung, Taipei County (TW);
Hung-Hsiu Yu, Changhua County (TW);
Yu-Liang Chung, Taipei (TW);
Shao-Yu Hsu, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 797 days.

This patent is subject to a terminal disclaimer.

(21) Appl. No.: 12/168,061

(22) Filed: Jul. 3, 2008

(65) Prior Publication Data
US 2008/0269972 A1    Oct. 30, 2008

Related U.S. Application Data

(63) Continuation-in-part of application No. 11/537,660, filed on Oct. 2, 2006, now Pat. No. 7,577,499.

(51) Int. Cl.
*G05B 19/04* (2006.01)
*G05B 19/18* (2006.01)

(52) U.S. Cl. ........ 700/253; 700/245; 700/250; 700/255; 700/258

(58) Field of Classification Search ................ 701/1, 22, 701/23, 36, 41, 300; 700/245, 253, 258–262
See application file for complete search history.

(56) References Cited

U.S. PATENT DOCUMENTS

| | | | |
|---|---|---|---|
| 4,674,048 A * | 6/1987 | Okumura | 701/25 |
| 4,962,453 A * | 10/1990 | Pong et al. | 701/23 |
| 5,002,145 A * | 3/1991 | Wakaumi et al. | 180/168 |
| 5,032,775 A * | 7/1991 | Mizuno et al. | 701/25 |
| 5,079,706 A * | 1/1992 | Yamaguchi et al. | 701/23 |
| 5,109,566 A * | 5/1992 | Kobayashi et al. | 15/319 |
| 5,192,837 A | 3/1993 | Chardon | |
| 5,293,955 A * | 3/1994 | Lee | 180/169 |
| 5,321,614 A * | 6/1994 | Ashworth | 701/26 |
| 5,903,124 A * | 5/1999 | Kawakami | 318/587 |
| 5,935,179 A * | 8/1999 | Kleiner et al. | 701/23 |
| 6,038,501 A * | 3/2000 | Kawakami | 701/23 |
| 6,076,025 A * | 6/2000 | Ueno et al. | 701/23 |
| 6,226,830 B1 * | 5/2001 | Hendriks et al. | 15/319 |

(Continued)

FOREIGN PATENT DOCUMENTS

CN    1600228    3/2005

(Continued)

*Primary Examiner* — Khoi Tran
*Assistant Examiner* — Bhavesh V Amin
(74) *Attorney, Agent, or Firm* — WPAT., P.C.; Justin King

(57) ABSTRACT

The present invention relates to an obstacle detection device, adapted for an autonomous mobile system, which comprises: a conducting wire, a first unit and a second unit. The first unit further comprises a first conducting part, electrically connected to an end of the conducting wire; and the second unit further comprises a second conducting part, electrically connected to another end of the conducting wire other than that connecting to the first conducting part. As an abnormality, such as the autonomous mobile system comes into contact with an obstacle, or misses a step, is happening and detected by the obstacle detection device, a reactive force will be generated to force the two conducting parts to contact with each other so as to enable an electrical conduction for issuing an electrical signal to the control unit of the autonomous mobile system and thus enabling the autonomous mobile system to react with respect to the abnormality.

13 Claims, 11 Drawing Sheets

U.S. PATENT DOCUMENTS

| | | | |
|---|---|---|---|
| 6,281,786 B1 * | 8/2001 | Adachi et al. | 340/435 |
| 6,481,515 B1 * | 11/2002 | Kirkpatrick et al. | 180/65.1 |
| 6,515,614 B2 * | 2/2003 | Sakai et al. | 342/70 |
| 6,941,199 B1 * | 9/2005 | Bottomley et al. | 701/23 |
| 7,155,308 B2 * | 12/2006 | Jones | 700/245 |
| 7,577,499 B2 * | 8/2009 | Sun et al. | 700/255 |
| 2002/0116089 A1 * | 8/2002 | Kirkpatrick, Jr. | 700/245 |
| 2004/0020000 A1 * | 2/2004 | Jones | 15/319 |
| 2004/0049877 A1 * | 3/2004 | Jones et al. | 15/319 |
| 2005/0022485 A1 * | 2/2005 | Park et al. | 55/385.1 |
| 2005/0251292 A1 | 11/2005 | Casey et al. | |

FOREIGN PATENT DOCUMENTS

| | | |
|---|---|---|
| DE | 10060208 A1 * | 6/2002 |
| TW | I220383 | 8/2004 |
| WO | WO 02/067745 A1 * | 9/2002 |

* cited by examiner

OBSTACLE DETECTION DEVICE OF AUTONOMOUS MOBILE SYSTEM

RELATED APPLICATIONS

This application is a continuation-in-part of U.S. Ser. No. 11/537,660, filed on Oct. 2, 2006, entitled "Obstacle detection device of automatic mobile system" and currently pending.

FIELD OF THE INVENTION

The present invention relates to an obstacle detection device for autonomous mobile system, and more particular, to an obstacle detection device capable of detecting an abnormality of an autonomous mobile system, such as the mobile system is colliding with an object or missing a step, by the detection of whether the electrical conduction between two conducting parts of the autonomous mobile system is enabled or not.

BACKGROUND OF THE INVENTION

With rapid advance of technology, most of the common household appliances are equipped with automation and intelligent control abilities. Among all those intelligent automated household appliances, an intelligent robot vacuum cleaner may be one of the household appliances most treasured by modern people, since it can clean one's home by itself and thus free a person from miscellaneous and daily cleaning obligations.

Please refer to FIG. 1, which is a schematic diagram showing a robotic vacuum cleaner disclosed in TW Pat. No. 1220383. The robotic vacuum cleaner 1 of FIG. 1 uses a linkage mechanism to detect and determine whether the robotic vacuum cleaner 1 is coming into contact with an obstacle. However, as the structure of the linkage mechanism is very complicated, the process for manufacturing the robotic vacuum cleaner 1 can be minute and complicated.

Please refer to FIG. 2, which is a schematic diagram showing an autonomous cleaning robot, disclosed in U.S. Pub. No. 20050251292. The an autonomous cleaning robot 2 of FIG. 2 utilizes a synchronous detection scheme realized by a plurality of infrared sensors 21 for preventing the cleaning robot 2 from being blocked by furniture or falling off a stair. However, as the amounts of infrared reflected by obstacles made of different materials are different, a huge database must be built to assist a logistic control program so as to ensure the cleaning robot to have a low-cost, accurate detection ability.

Therefore, it is in need of an obstacle detection device for autonomous mobile system that can overcome the aforesaid shortcomings.

SUMMARY OF THE INVENTION

The primary object of the present invention is to provide an obstacle detection device capable of detecting an abnormality of an autonomous mobile system, such as the mobile system is colliding with an object or missing a step, by the detection of whether the electrical conduction between two conducting parts of the autonomous mobile system is enabled or not.

To achieve the above object, the present invention provides an obstacle detection device, adapted for detecting abnormalities of an autonomous mobile system, which comprises: a conducting wire, a first unit and a second unit; wherein, the first unit further comprises a first conducting part, electrically connected to an end of the conducting wire; the second unit further comprises a second conducting part, electrically connected to another end of the conducting wire other than that connecting to the first conducting part. As an abnormality, such as the autonomous mobile system comes into contact with an obstacle, or misses a step, is happening and detected by the obstacle detection device, a reactive force will be generated to force the two conducting parts to contact with each other so as to enable an electrical conduction for issuing an electrical signal to the control unit of the autonomous mobile system and thus enabling the autonomous mobile system to react with respect to the abnormality.

Preferably, a voltage source and a resistor are connected to the conducting wire.

Preferably, the reaction performed by the autonomous mobile system can be one of the following actions: stopping the moving of the autonomous mobile system, enabling the autonomous mobile system to turn and head in a random direction, and the like.

In addition, to achieve the above object, the present invention provides another obstacle detection device, adapted for detecting whether an autonomous mobile system is colliding with an obstacle, which comprises: a conducting wire, a pin and a conducting plate; wherein the pin, being arranged on a front bumper of the autonomous mobile system, further comprises a first conducting part, electrically connected to an end of the conducting wire; the conducting plate, being arranged on a base of the autonomous mobile system, further comprises a second conducting part, electrically connected to another end of the conducting wire other than that connecting to the first conducting part. As the autonomous mobile system collides with the obstacle, a reactive force will be generated to force the front bumper to press the pin while causing the two conducting parts to contact with each other so as to enable an electrical conduction for issuing an electrical signal to the control unit of the autonomous mobile system and thus enabling the autonomous mobile system to react with respect to the collision.

Preferably, a pin bearer, having a pin hole boring therethrough for receiving the pin, is arranged at a position between the pin and the conducting plate, whereas the first conducting part of the pin is enabled to move reciprocatively inside the pin hole while the pin is inserted into the pin hole, and the second conducting part of the base is aligned to the pin hole for enabling the first conducting part can be moved to come into contact with the second conducting part.

Preferably, a voltage source and a resistor are connected to the conducting wire.

Preferably, a spring is arranged between the pin and the conducting plate in a manner that the elastic force of the spring can be used for enabling the pin to move reciprocatively, whereas the spring can be an article selected from the group consisting of a compression spring, a tension spring, a plate spring, and a torsion spring.

Preferably, the reaction performed by the autonomous mobile system can be one of the following actions: stopping the moving of the autonomous mobile system, enabling the autonomous mobile system to turn and head in a random direction, and the like.

Moreover, to achieve the above object, the present invention provides further another obstacle detection device, adapted for detecting whether an autonomous mobile system is colliding with an obstacle, which comprises: a conducting wire, a first reed and a second reed; wherein, the first reed, being arranged on a front bumper of the autonomous mobile system, further comprises a first conducting part, electrically connected to an end of the conducting wire; the second reed, being arranged on a base of the autonomous mobile system, further comprises a second conducting part, electrically connected to another end of the conducting wire other than that connecting to the first conducting part. As the autonomous mobile system collides with the obstacle, a reactive force will be generated to force the front bumper to press the first reed while causing the two conducting parts to contact with each other so as to enable an electrical conduction for issuing an electrical signal to the control unit of the autonomous mobile system and thus enabling the autonomous mobile system to react with respect to the collision.

Preferably, a voltage source and a resistor are connected to the conducting wire.

Preferably, an end of the first reed is connected to a side of an insulating plate while another side of the insulating plate is connected to an end of the second reed.

Preferably, the reaction performed by the autonomous mobile system can be one of the following actions: stopping the moving of the autonomous mobile system, enabling the autonomous mobile system to turn and head in a random direction, and the like.

In addition, the present invention provides further another obstacle detection device, adapted for detecting whether an autonomous mobile system is colliding with an obstacle, which comprises: a conducting wire, a spring and a limit switch; wherein, the two ends of the spring are respectively affixed to a front bumper and a frame of the autonomous mobile system; the limit switch is arranged at the frame of the autonomous mobile system while connecting the two ends of the limit switch respectively to the two ends of the conducting wire. As the autonomous mobile system collides with the obstacle, a reactive force will be generated by the spring to force the front bumper to press a reed of the limit switch so as to enable an electrical conduction of the limit switch and thus enable the limit switch to issue an electrical signal to the control unit of the autonomous mobile system and thus enabling the autonomous mobile system to react with respect to the collision.

Preferably, a voltage source and a resistor are arranged at the conducting wire.

Preferably, two protrusions are respectively arranged at the two ends of the inner side of the front bumper for enabling the two to press upon the reed of the limit switch so as to activate the electrical conduction of the limit switch.

Preferably, the reaction performed by the autonomous mobile system can be one of the following actions: stopping the moving of the autonomous mobile system, enabling the autonomous mobile system to turn and head in a random direction, and the like.

Furthermore, to achieve the above object, the present invention provides yet another obstacle detection device, adapted for detecting whether an autonomous mobile system is missing a step, which comprises: a conducting wire, a telescopic rod and a sensing seat; wherein, the telescopic rod, being arranged on a base of the autonomous mobile system, further comprises a first conducting part, electrically connected to an end of the conducting wire while being coupled to a roller of the autonomous mobile system so as to be driven to move thereby; the sensing seat, being arranged on a frame of the autonomous mobile system, further comprises a second conducting part, electrically connected to another end of the conducting wire other than that connecting to the first conducting part. As the autonomous mobile system misses a step enabling the roller to hang in the air, the a telescopic rod is enabled to extend causing the two conducting parts to contact with each other so as to enable an electrical conduction for issuing an electrical signal to the control unit of the autonomous mobile system and thus enabling the autonomous mobile system to react with respect to the missing of step.

Preferably, a voltage source and a resistor are connected to the conducting wire.

Preferably, a spring is arranged surrounding the telescopic rod in a manner that the first conducting part is separated from the second conducting part for breaking the electrical conduction between the two as the spring is being pressed by a pressing force, and the first conducting part is driven to contact with the second conducting part for enabling the electrical conduction as the spring is relieved from the pressing force, wherein the spring can be an article selected from the group consisting of a compression spring, a tension spring, a plate spring, and a torsion spring.

Preferably, the reaction performed by the autonomous mobile system can be one of the following actions: enabling the autonomous mobile system to start moving backward, enabling the autonomous mobile system to turn and head in a random direction, and the like.

In addition, the present invention provides yet another obstacle detection device, adapted for detecting whether an autonomous mobile system is missing a step, which comprises: a conducting wire, a spring and a limit switch; wherein, the two ends of the spring are respectively affixed to a front bumper and a frame of the autonomous mobile system; the limit switch is arranged at the frame of the autonomous mobile system while connecting the two ends of the limit switch respectively to the two ends of the conducting wire. As the autonomous mobile system collides with the obstacle, a reactive force will be generated by the spring to force the front bumper to press a reed of the limit switch so as to enable an electrical conduction of the limit switch and thus enable the limit switch to issue an electrical signal to the control unit of the autonomous mobile system and thus enabling the autonomous mobile system to react with respect to the collision.

Preferably, a voltage source and a resistor are arranged at the conducting wire.

Preferably, two protrusions are respectively arranged at the two ends of the inner side of the front bumper for enabling the two to press upon the reed of the limit switch so as to activate the electrical conduction of the limit switch.

Preferably, the reaction performed by the autonomous mobile system can be one of the following actions: stopping the moving of the autonomous mobile system, enabling the autonomous mobile system to turn and head in a random direction, and the like.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
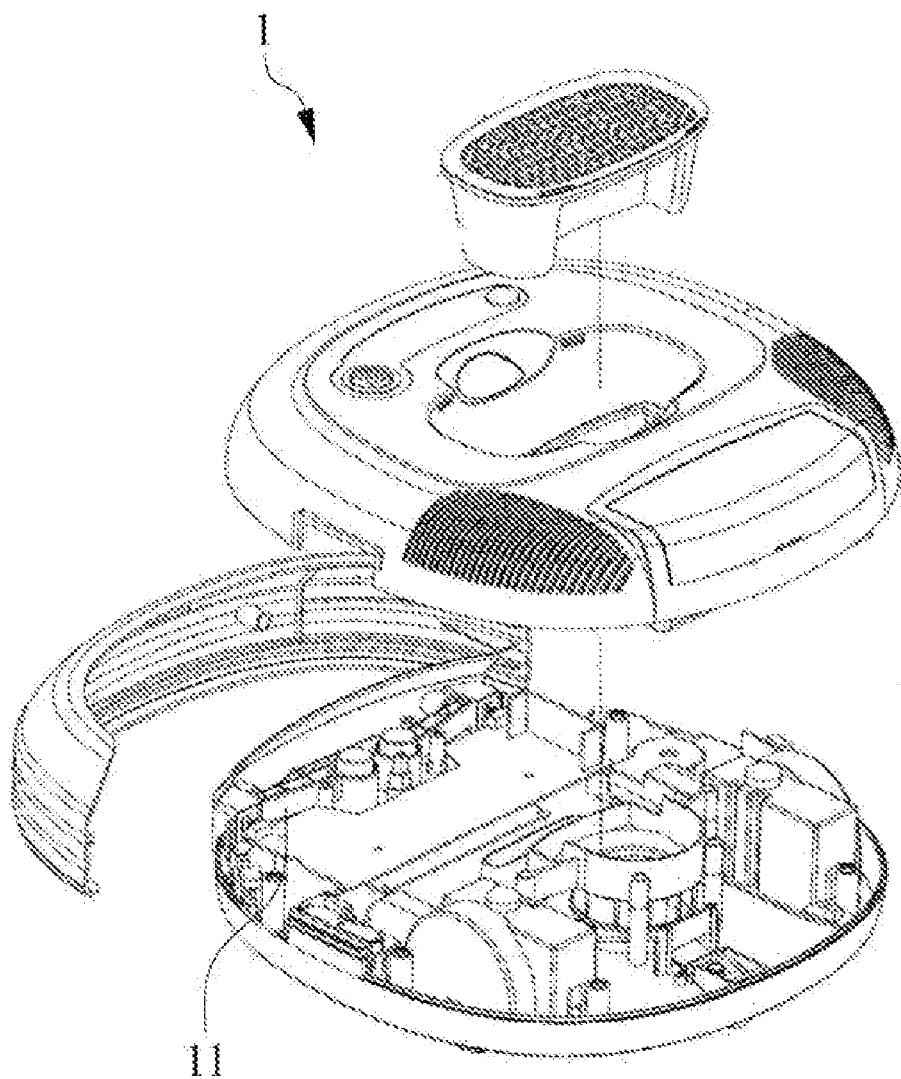
FIG. 1 is a schematic diagram showing a robotic vacuum cleaner disclosed in TW Pat. No. 1220383.
Figure 2:
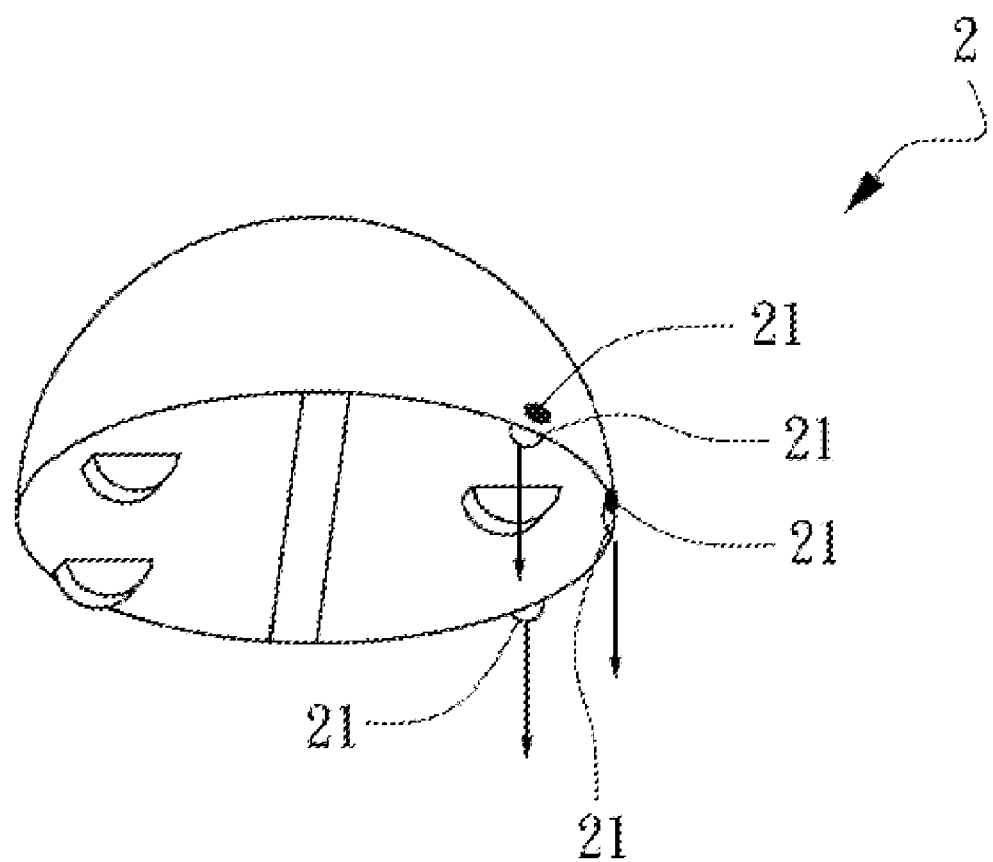
FIG. 2 is a schematic diagram showing an autonomous cleaning robot, disclosed in U.S. Pub. No. 20050251292.
Figure 3:
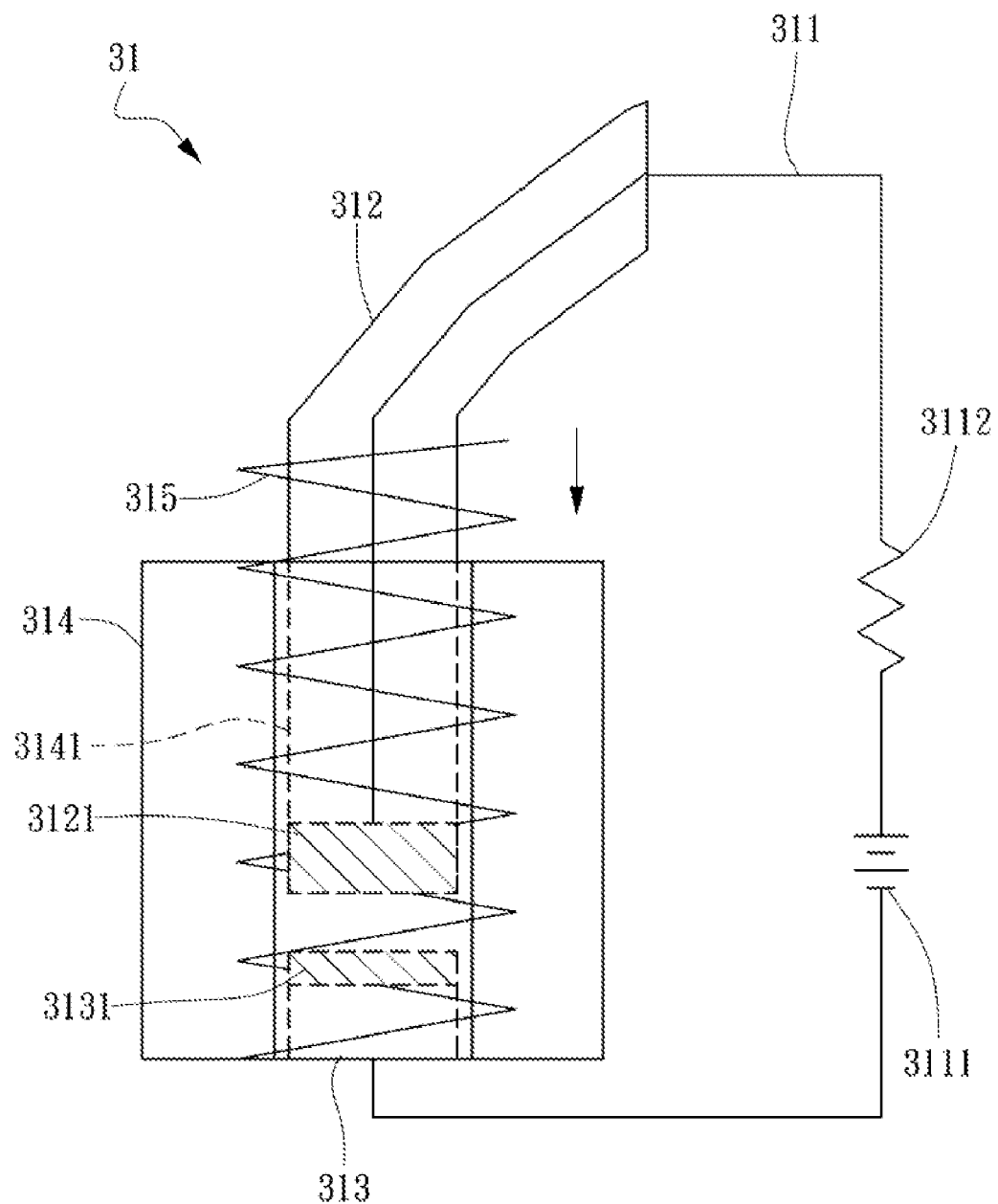
FIG. 3 is a schematic diagram showing an obstacle detection device of an autonomous mobile system according to a first preferred embodiment of the invention.
Figure 4:
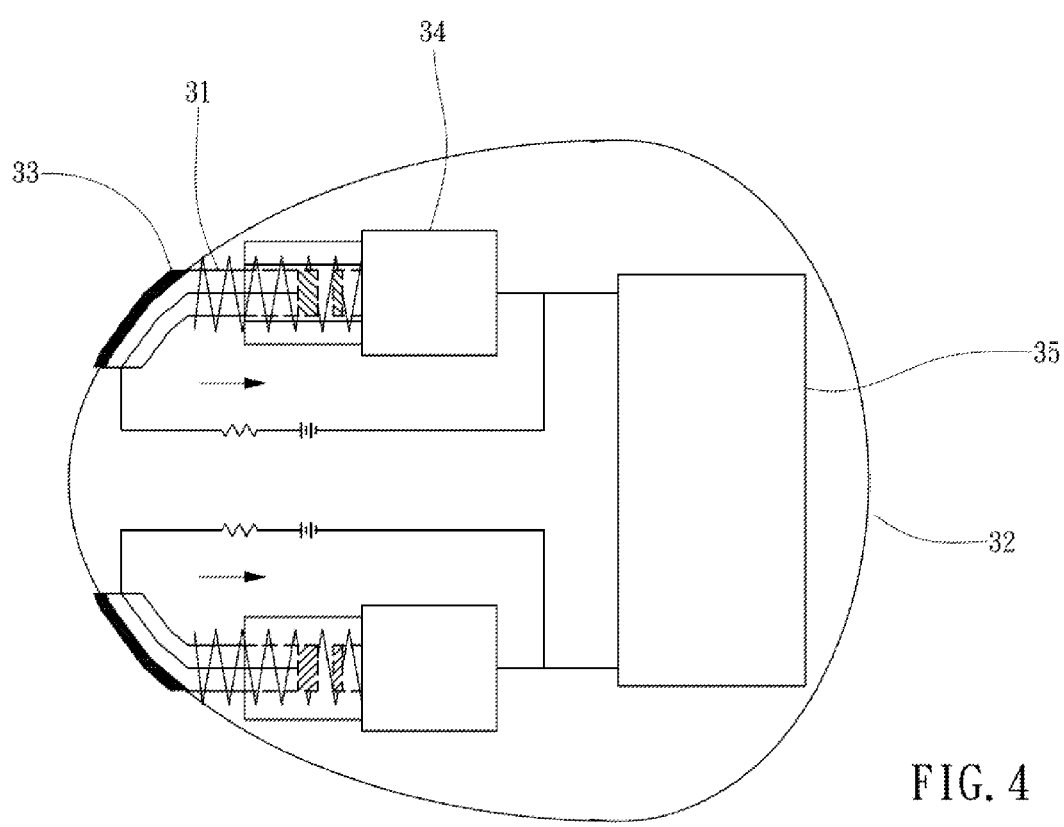
FIG. 4 is a top view of the obstacle detection device of FIG. 3, whereas the obstacle detection device is arranged inside the autonomous mobile system.

Please refer to FIG. 3 and FIG. 4, which are respectively a schematic diagram showing an obstacle detection device of an autonomous mobile system according to a first preferred embodiment of the invention, and a top view of the obstacle detection device of FIG. 3. In FIG. 4, two obstacle detection devices 31, used for collision detection, are arranged inside the frame 32 of an autonomous mobile system 3, while two front bumpers 33 are arranged at the outer side the frame 32 and two bases 34 are arranged at the lower portion of the frame 32, all at positions corresponding to the two obstacle detection devices 31 in respective. As seen in FIG. 3, each obstacle detection device 31 is comprised of a first conducting wire 311, a pin 312, a conducting plate 313, a pin bearer 314 and a first spring 315. The pin 312 is attached to it corresponding front bumper 33 in a manner that it can be driven to move thereby; and the conducting plate 313 is fixed to it corresponding base 34. There are a first voltage source 3111 and a first resistor 3112 serially connected to the first conducting wire 311, while an end of the first conducting wire 311 is connected to a first conducting part 3121 of the pin and another end of the first conducting wire 311 is connected to a second conducting part 3131 of the conducting plate 313. The pin bearer 314 is fixed to the base 34, which has a pin hole 3141 boring through the pin bearer 314 for receiving the pin 312 while enabling the pin 312 to move reciprocatively therein. Moreover, the second conducting part 3131 is aligned to the pin hole 3141 so that when the pin 312 is inserted into the pin hole 3141, the first conducting part 3121 can come into contact with the second conducting part 3131 so as to enable an electrical conduction. In addition, the first spring 315 is arranged at a location between the pin 312 and the conducting plate 313 while being arranged inside the pin hole 3141 for ensheathing the pin 312 as the pin 312 is inserted therein, such that the first conducting part 3121 is separated from the second conducting part 3131 for breaking the electrical conduction between the two as the pin 312 is relieved from an external force and being push to exit the pin hole 3141 by the first spring 315. In an exemplary embodiment, the frame 32 can be composed of a shell and a chassis, and the shell and the chassis can be integrally formed, however it is not limited thereby.

As each front bumper 33 is arranged at the outer side of the frame 32, it is exposed in a manner that it can come into contact directly with an obstacle. Therefore, as the autonomous mobile system 3 is colliding to an obstacle, the force caused by the collision will force the front bumper 33 to press against the pin 312 which further compresses the first spring 315 to an extend that the first conducting part 3121 is coming into contact with the second conducting part 3131 so as to enable an electrical conduction for issuing an electrical signal to the control unit 35 of the autonomous mobile system 3 for enabling the autonomous mobile system 3 to react with respect to the collision, such as turn or stop, and thus freeing the autonomous mobile system 3 from the block of the obstacle. As soon as the autonomous mobile system 3 is freed form the obstacle, the elastic force of the compressed first spring 315 will force the pin 312 as well as the front bumper to return to their original positions, and thus the first conducting part 3121 is separated from the second conducting part 3131 such that the electrical conduction is broken for enabling the control unit 35 to act accordingly, such as directing the autonomous mobile system 3 to resume normal operation. In this embodiment, since the pin 312 is not electrical conductive, a first conducting part 3121 made of a conductive material must be arranged on the pin 312 at a position corresponding to the second conducting part 3131, however, the configuration of the pin 312 is not limited thereby. It is noted that if the pin 312 is made of a conductive material, there is no need to form the first conducting part 3121 there on any more.

Figure 11:
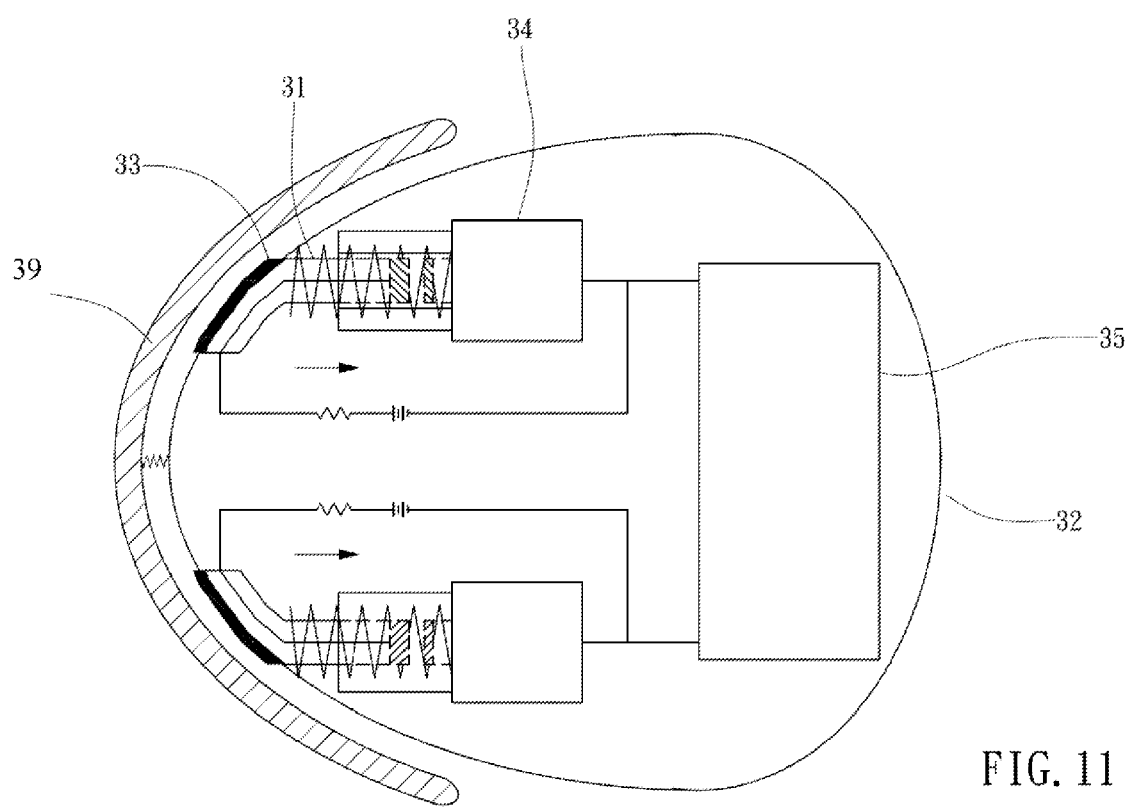
FIG. 11 is a schematic diagram showing an obstacle detection device of an autonomous mobile system according to a sixth preferred embodiment of the invention.

However, it is possible to configure a buffering plate 39 on the frame 32 of the autonomous mobile system 3 at a position in front of the front bumpers 33, as the one shown in the embodiment of FIG. 11, which can be a curved plate covering almost all the front half of the autonomous mobile system 3 while shielding the two front bumpers 33 therewith. It is noted that the front bumpers 33 can be integrally formed with the buffering plate 39 or attached directly to the buffering plate 39 in a manner that each front bumper 33 can be considered as a component of the buffering plate 39. By the disposition of the buffering plate 39, when the autonomous mobile system 3 collides with an obstacle at its right front end, the buffering plate 39 will be pressed by the collision and thus exert a larger reaction force on the front bumper 33 that is disposed at the right front end of the autonomous mobile system 3 and a smaller reaction force on the front bumper 33 that is disposed at the left front end of the autonomous mobile system 3, so that the control unit 35 will direct the autonomous mobile system 3 to turn left; and when the autonomous mobile system 3 collides with an obstacle at its left front end, the front bumper 33 at the left will subject to a larger reaction force from the buffering plate comparing to the smaller force exerted on the right front bumper so that the control unit 35 will direct the autonomous mobile system 3 to turn right; and when the autonomous mobile system 3 collides with an obstacle head on, the two front bumpers 33 will receive almost the same reaction forces from the buffering plate 39 so that control unit 35 will direct the autonomous mobile system 3 to back off for a specific distance.

Figure 5:
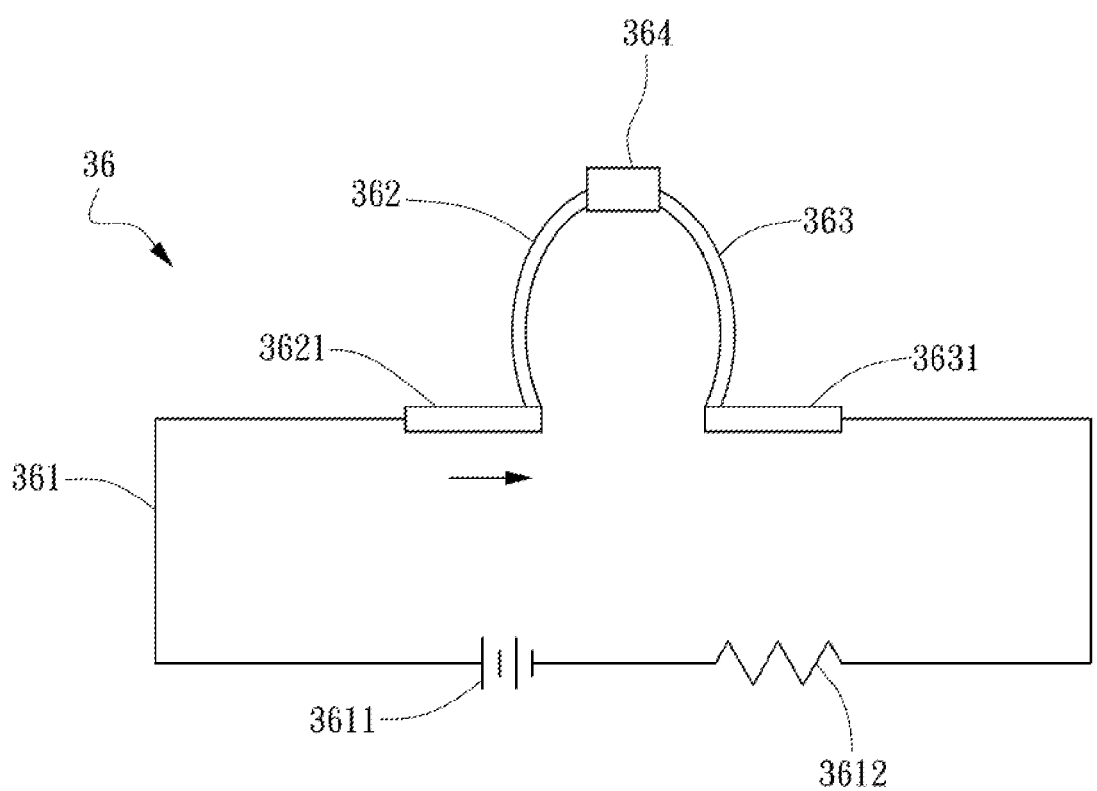
FIG. 5 is a schematic diagram showing an obstacle detection device of an autonomous mobile system according to a second preferred embodiment of the invention.
Figure 6:
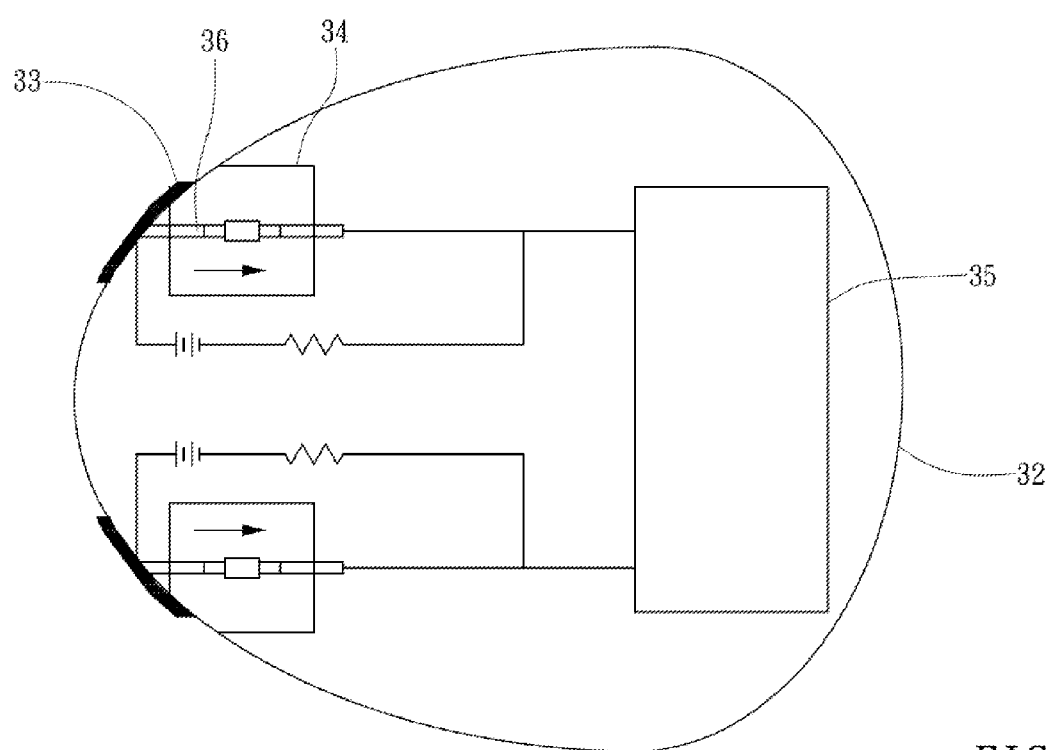
FIG. 6 is a top view of the obstacle detection device of FIG. 5, whereas the obstacle detection device is arranged inside the autonomous mobile system.

Please refer to FIG. 5 and FIG. 6, which are respectively a schematic diagram showing an obstacle detection device of an autonomous mobile system according to a second preferred embodiment of the invention, and a top view of the obstacle detection device of FIG. 5. In FIG. 6, two obstacle detection devices 36, used for collision detection, are arranged inside the frame 32 of an autonomous mobile system 3, while two front bumpers 33 are arranged at the outer side the frame 32 and two bases 34 are arranged at the lower portion of the frame 32, all at positions corresponding to the two obstacle detection devices 36 in respective. Similarly, the frame 32 can be composed of a shell and a chassis, and the shell and the chassis can be integrally formed, however it is not limited thereby. As seen in FIG. 5, each obstacle detection device 36 is comprised of a second conducting wire 361, a first reed 362, a second reed 363, and an insulating plate 364. The first reed 362 is attached to it corresponding front bumper 33 in a manner that it can be driven to move thereby; and the second reed 363 is fixed to it corresponding base 34. Moreover, an end of the first reed 362 is connected to the insulating plate 364 and another end thereof is configured with a third conducting part 3621, while an end of the second reed 363 is connected to the insulating plate 364 and another end thereof is configured with a fourth conducting part 3631. There are a second voltage source 3611 and a second resistor 3612 serially connected to the second conducting wire 361, while an end of the second conducting wire 361 is connected to the third conducting part 3621 and another end of the second conducting wire 361 is connected to a fourth conducting part 3631.

Similarly, as each front bumper 33 is arranged at the outer side of the frame 32, it is exposed in a manner that it can come into contact directly with an obstacle. Therefore, as the autonomous mobile system 3 is colliding to an obstacle, the force caused by the collision will force the front bumper 33 to press against the first reed 362 to an extend that the third conducting part 3621 is driven to come into contact with the fourth conducting part 3631 so as to enable an electrical conduction for issuing an electrical signal to the control unit 35 of the autonomous mobile system 3 for enabling the autonomous mobile system 3 to react with respect to the collision, such as turn or stop, and thus freeing the autonomous mobile system 3 from the block of the obstacle. As soon as the autonomous mobile system 3 is freed form the obstacle, the resilience of the first reed 362 and the second reed 363 will force the third conducting part 3621 to separate from the fourth conducting part 3631 such that the electrical conduction is broken for enabling the control unit 35 to act accordingly, such as directing the autonomous mobile system 3 to resume normal operation.

Similarly, it is possible to configure a buffering plate 39 on the frame 32 of the autonomous mobile system 3 at a position in front of the front bumpers 33, as the one shown in the sixth embodiment of FIG. 11, which can be a curved plate covering almost all the front half of the autonomous mobile system 3 while shielding the two front bumpers 33 therewith. It is noted that the front bumpers 33 can be integrally formed with the buffering plate 39 or attached directly to the buffering plate 39 in a manner that each front bumper 33 can be considered as a component of the buffering plate 39. By the disposition of the buffering plate 39, when the autonomous mobile system 3 collides with an obstacle at its right front end, the buffering plate 39 will be pressed by the collision and thus exert a larger reaction force on the front bumper 33 that is disposed at the right front end of the autonomous mobile system 3 and a smaller reaction force on the front bumper 33 that is disposed at the left front end of the autonomous mobile system 3, so that the control unit 35 will direct the autonomous mobile system 3 to turn left; and when the autonomous mobile system 3 collides with an obstacle at its left front end, the front bumper 33 at the left will subject to a larger reaction force from the buffering plate comparing to the smaller force exerted on the right front bumper so that the control unit 35 will direct the autonomous mobile system 3 to turn right; and when the autonomous mobile system 3 collides with an obstacle head on, the two front bumpers 33 will receive almost the same reaction forces from the buffering plate 39 so that control unit 35 will direct the autonomous mobile system 3 to back off for a specific distance.

Figure 7:
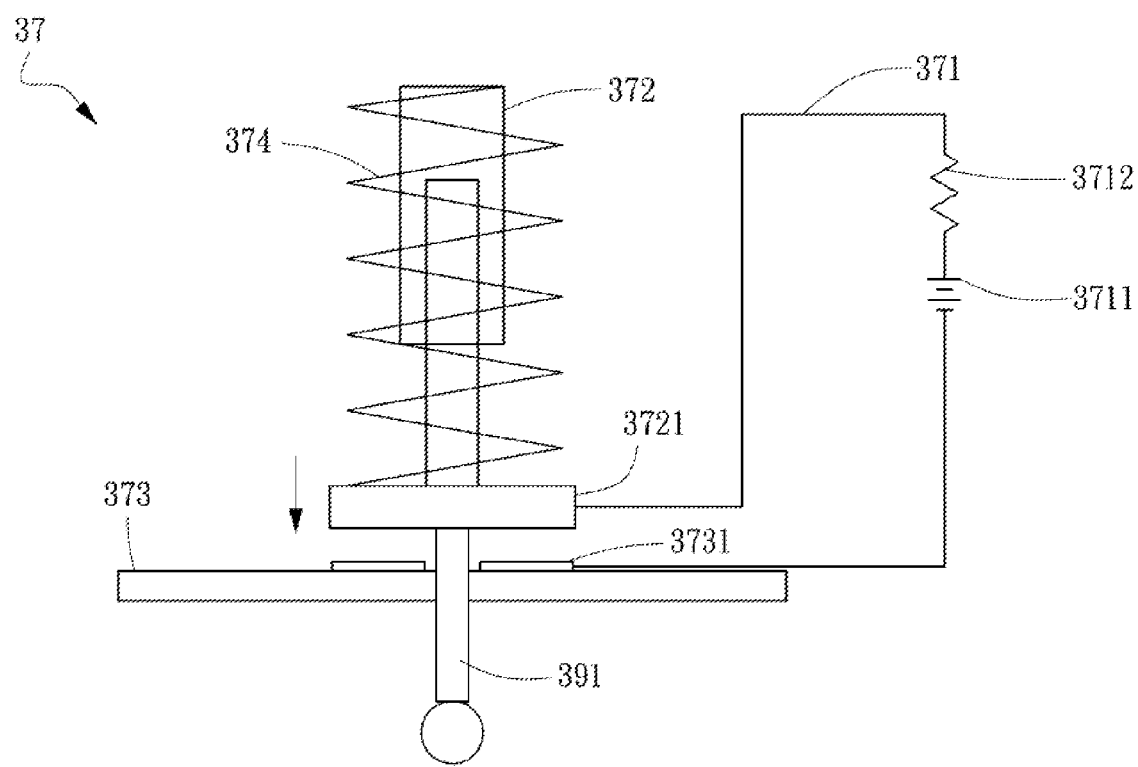
FIG. 7 is a schematic diagram showing an obstacle detection device of an autonomous mobile system according to a third preferred embodiment of the invention.
Figure 8:
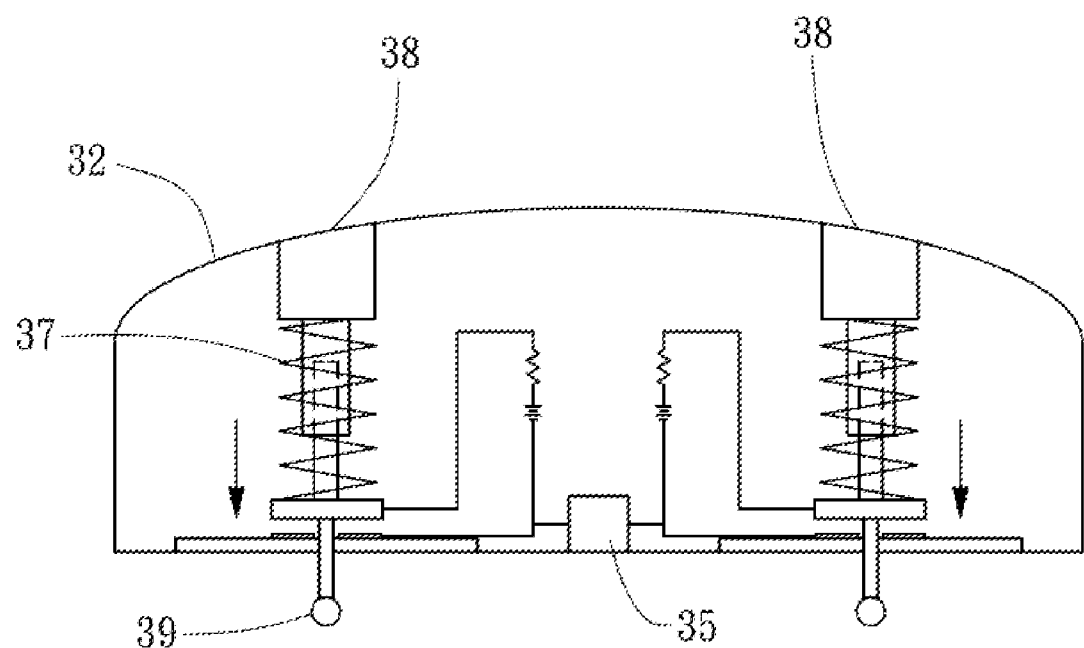
FIG. 8 is a front view of the obstacle detection device of FIG. 7, whereas the obstacle detection device is arranged inside the autonomous mobile system.

Please refer to FIG. 7 and FIG. 8, which are respectively a schematic diagram showing an obstacle detection device of an autonomous mobile system according to a second preferred embodiment of the invention, and a top view of the obstacle detection device of FIG. 7. In FIG. 8, two obstacle detection devices 37, used for detecting a missing of step, are arranged inside the frame 32 of an autonomous mobile system 3, while two bases 34 are arranged onto the frame 32 at positions corresponding to the two obstacle detection devices 37 in respective. As seen in FIG. 7, each obstacle detection device 37 is comprised of a third conducting wire 371, a telescopic rod 372, a sensing seat 373, and a second spring 374. The telescopic rod 372, composed of an inner tube and an outer tube, is attached to it corresponding base 38 by one end thereof while enabling another end thereof, having a fifth conducting part 3721 formed thereon, to connect to a roller 39 of the autonomous mobile system 3 in a manner that it can be driven to move thereby; and the sensing seat 373 is fixed to the frame 32, which is configured with a hole for enabling the corresponding roller 39 to connect to the fifth conducting part 3721 therethrough. It is noted that the frame 32 can be composed of a shell and a chassis, and the shell and the chassis can be integrally formed, however it is not limited thereby. Moreover, the second spring 374 is arranged to ensheathe the telescopic rod 372. There are a third voltage source 3711 and a third resistor 3712 serially connected to the third conducting wire 371, while an end of the third conducting wire 361 is connected to the fifth conducting part 3721 of the telescopic rod 372 and another end of the third conducting wire 371 is connected to a six conducting part 3731 formed on the sensing seat 373. It is noted that a side of the fifth conducting part 3721 is connected to an end of the telescopic rod 372 while another side of the fifth conducting part 3721 is connected to the supporting rod 391 of the roller 39.

As the autonomous mobile system 3 is moving normally on the ground, the roller 39 carrying the weight of the autonomous mobile system 3 will exert a force to compress the second spring 374 to an extend that the fifth conducting part 3721 is separated from the six conducting part 3731 and thus an electrical conduction is broken. However, if the roller 39 miss a step, the second spring 374 will be relieved form the force and the elastic force of the second spring 374 will drive the telescopic rod 372 to extend and thus enable the fifth conducting part 3721 to come into contact with the six conducting part 3731 so as to enable an electrical conduction for issuing an electrical signal to the control unit 35 of the autonomous mobile system 3 for enabling the autonomous mobile system 3 to react with respect to the missing of step, such as turn or back-off, and thus preventing the autonomous mobile system 3 from being damaged by falling.

Moreover, in the embodiment shown in FIG. 7 and FIG. 8, there can be at least an idler wheel being arranged at a position behind the rollers 39 of the autonomous mobile system 3 in a manner that each of the at least one idler wheel is enabled to be raised/dropped corresponding to the extending/retracting of the telescope rod 372. That is, when the autonomous mobile system 3 is moving normally on the ground and the telescope rod 372 is pressed to retract, each idle wheel is raised without contacting to the ground; and when the autonomous mobile system 3 miss a step that cause the telescope rod 372 to extend, each idle wheel will be dropped to the ground and is activated to rotate in reverse for saving the autonomous mobile system 3 from the missing step by backing off the same. Thereby, when the autonomous mobile system 3 hit a hole on the ground or comes into contact with a descending stair by that its telescope rod 372 is extended in to the hole or abutted against the wall of the staircase from the missing step, the idle wheel will be dropped to the ground for raising the autonomous mobile system 3 and rotate in reverse for driving the autonomous mobile system 3 to move backward while preventing the autonomous mobile system 3 from being blocked by the releasing the extended telescope rod 372 from the trapping of the hole or the blocking of the staircase wall.

Figure 9:
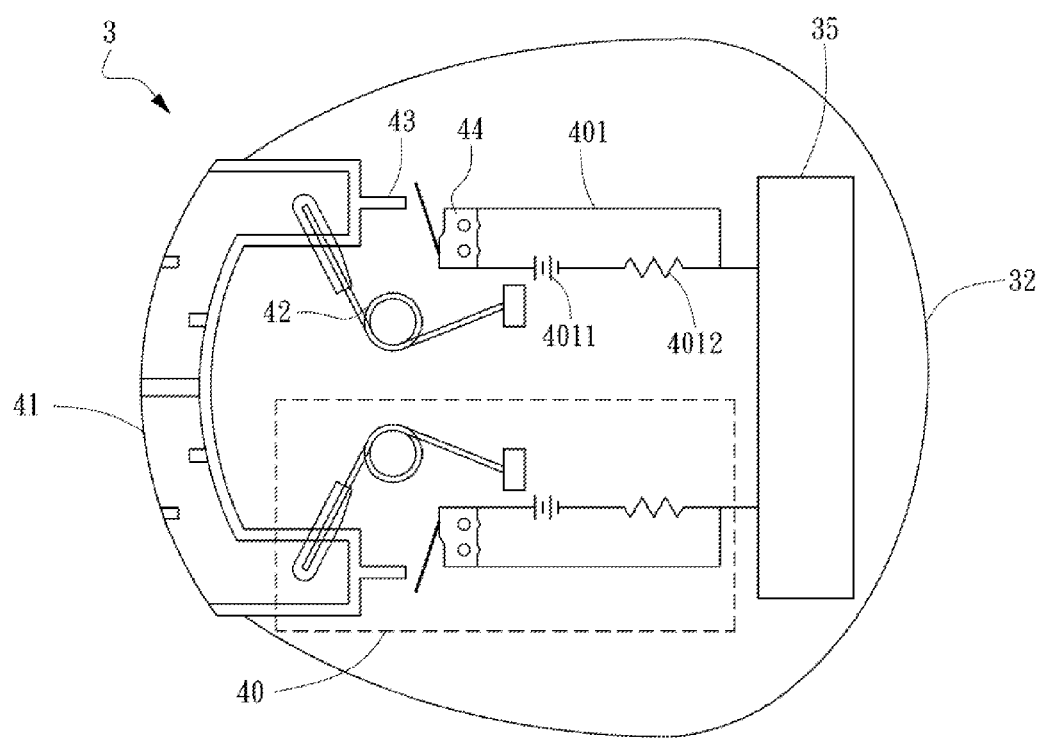
FIG. 9 is a schematic diagram showing an obstacle detection device of an autonomous mobile system according to a fourth preferred embodiment of the invention.

Please refer to FIG. 9, which is a schematic diagram showing an obstacle detection device of an autonomous mobile system according to a fourth preferred embodiment of the invention. In FIG. 9, two obstacle detection devices 40, used for collision detection, are arranged inside the frame 32 of an autonomous mobile system 3, while a front bumpers 41, being arranged at the outer side the frame 32, is structured to have each of the two inner end of the front bumper 41 to be fitted with a spring 42 and a protrusion 43. Similarly, the frame 32 can be composed of a shell and a chassis, and the shell and the chassis can be integrally formed, however it is not limited thereby. In Addition, each of the two obstacle detection devices 40 is further comprised of a fourth conducting wire 401 and a limit switch 44, whereas a fourth voltage source 4011 and a fourth resistor 4012 are arranged at the fourth conducting wire 401.

As the front bumper 41 is arranged at the outer side of the frame 32, it is exposed in a manner that it can come into contact directly with an obstacle. Therefore, as the autonomous mobile system 3 is colliding to an obstacle, the force caused by the collision will force the front bumper 41 to press against the spring 42 to an extend that the protrusion 43 will press on the limit switch 44 for enabling the electric conduction of the limit switch 44 and thus forming an electric circuit. By the electric circuit, an electric signal is transmitted to the control unit 35 for enabling the autonomous mobile system 3 to react with respect to the collision, such as turn or stop, and thus freeing the autonomous mobile system 3 from the block of the obstacle. As soon as the autonomous mobile system 3 is freed form the obstacle, the resilience of the spring 42 will cause the spring 42 to resume its original status so that the limit switch 44 is deactivated and the electric circuit is broken for enabling the control unit 35 to act accordingly, such as directing the autonomous mobile system 3 to resume normal operation.

Figure 10:
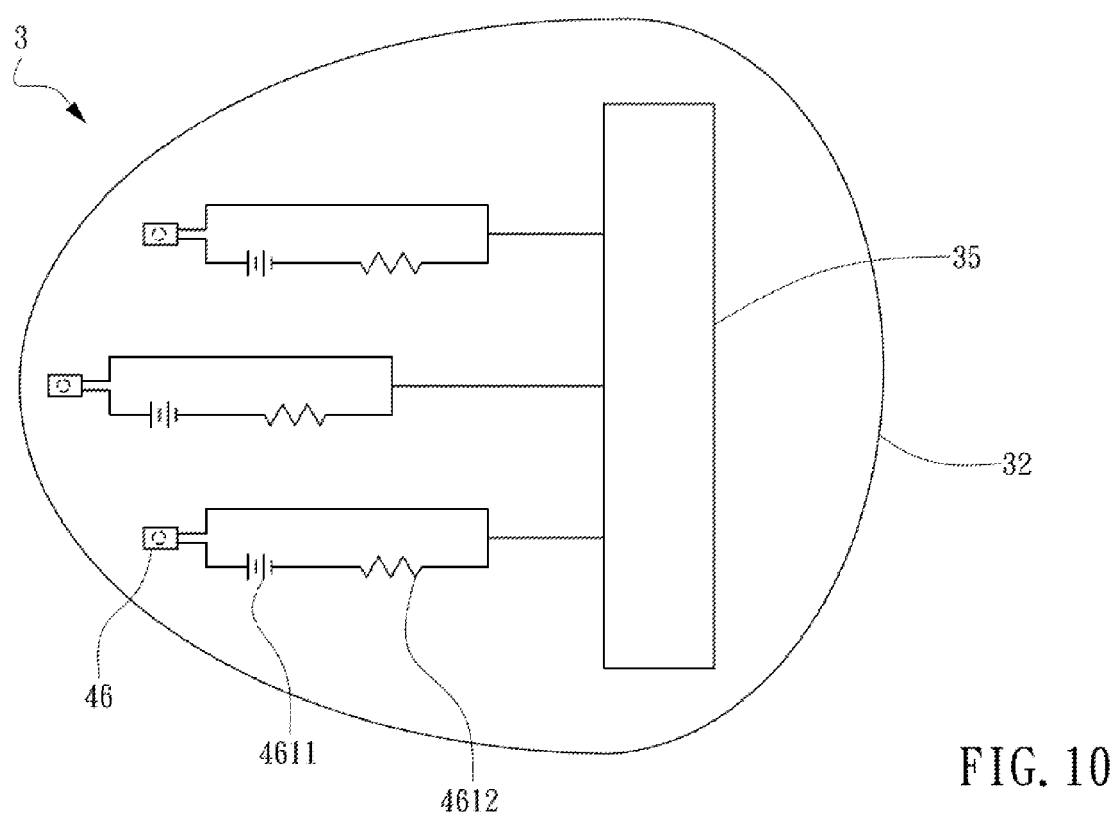
FIG. 10 is a schematic diagram showing an obstacle detection device of an autonomous mobile system according to a fifth preferred embodiment of the invention.

Please refer to FIG. 10, which is a schematic diagram showing an obstacle detection device of an autonomous mobile system according to a fifth preferred embodiment of the invention. In FIG. 10, three photo interrupters 46, used for detecting a missing of step, are respectively arranged at positions of the frame 32 corresponding to the middle front, the front left and the front right thereof. In Addition, a fifth voltage source 4611 and a fifth resistor 4612 are arranged at a fifth conducting wire 461 whereas the two end of the fifth conducting wire are respectively connected to the two ends of the photo interrupters 46.

As the autonomous mobile system 3 is moving normally on the ground and is missing a step, the missing of step will be detected by the photo interrupters 46 for enabling an electric conduction and thus form an electric circuit. By the electric circuit, an electric signal is transmitted to the control unit 35 for enabling the autonomous mobile system 3 to react with respect to the missing of step, such as turn or back-off, and thus preventing the autonomous mobile system 3 from being damaged by falling.

Similarly, in the embodiment shown in FIG. 10, there can be at least an idler wheel being arranged at a position behind the rollers 39 of the autonomous mobile system 3 in a manner that each of the at least one idler wheel is enabled to be raised/dropped corresponding to the extending/retracting of the telescope rod 372. That is, when the autonomous mobile system 3 is moving normally on the ground and the telescope rod 372 is pressed to retract, each idle wheel is raised without contacting to the ground; and when the autonomous mobile system 3 miss a step that cause the telescope rod 372 to extend, each idle wheel will be dropped to the ground and is activated to rotate in reverse for saving the autonomous mobile system 3 from the missing step by backing off the same. Thereby, when the autonomous mobile system 3 hit a hole on the ground or comes into contact with a descending stair by that its telescope rod 372 is extended in to the hole or abutted against the wall of the staircase from the missing step, the idle wheel will be dropped to the ground for raising the autonomous mobile system 3 and rotate in reverse for driving the autonomous mobile system 3 to move backward while preventing the autonomous mobile system 3 from being blocked by the releasing the extended telescope rod 372 from the trapping of the hole or the blocking of the staircase wall.

As the obstacle detection device shown in FIG. 7 and FIG. 10 is good for detecting a missing of step while those obstacle detection devices shown in FIG. 3, FIG. 5 and FIG. 9 are good for collision detection, it is feasible to integrate the aforesaid types of obstacle detection devices into an individual autonomous mobile system so that the autonomous mobile system is equipped with abilities of collision detection and step-missing detection.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An autonomous mobile system with an obstacle detection device for detecting whether said autonomous mobile system is colliding with an obstacle, comprising:
    said obstacle detection device; and
    a buffering plate, arranged in front of said autonomous mobile system;
    wherein said obstacle detection device is consisted of
        a frame;
        a front bumper, arranged at outside and front of the frame for colliding the obstacle;
        a control unit;
        a first spring;
        a second spring;
        a first pin with a first pin's first end and a first pin's second end, wherein said first pin is positioned within said first spring;
        a second pin with a second pin's first end and a second pin's second end, wherein said second pin is positioned within said second spring;
        a first conducting plate;
        a second conducting plate;
        a first pin bearer having a first pin hole boring therethrough with a first pin's hole's first end and a first pin's hole's second end; wherein said first pin bearer receives said first pin's first end and said first spring at said first pin hole's first end, and said first conducting plate is positioned at said first pin hole's second end and aligned to said first pin's first end;

a second pin bearer having a second pin hole boring therethrough with a second pin's hole's first end and a second pin's hole's second end; wherein said second pin bearer receives said second pin's first end and said second spring at said second pin hole's first end, and said second conducting plate is positioned at said second pin hole's second end and aligned to said second pin's first end;

a first conducting wire connecting said first pin's second end, said first conducting plate, said control unit, a first voltage source, and a first resistor; and a second conducting wire connecting said second pin's second end, said second conducting plate, said control unit, a second voltage source, and a second resistor;

wherein, as the autonomous mobile system collides with the obstacle by said buffering plate, a reactive force will be generated to make the front bumper press against the pin horizontally while causing the conducting plate to contact said pin's first end as to enable an electrical conduction for issuing an electrical signal to the control unit of the autonomous mobile system and thus enabling the autonomous mobile system to react with respect to the collision;

wherein the first pin and the second pin are enabled to move reciprocatively inside the first pin hole and the second pin hold while the first pin and the second pin are inserted into the first pin hole and the second pin hold, and the first conducting plate and the second conducting plate are aligned to the first pin hole and the second pin hole for enabling the first pin's first end and the second pin's first end be moved to come into contact with the first conducting plate and the second conducting plate; and wherein reaction performed by the autonomous mobile system is selected from a group consisting of: stopping the moving of the autonomous mobile system, and enabling the autonomous mobile system to turn and head in a random direction.

2. The autonomous mobile system of claim 1, wherein said buffering plate is arranged on the autonomous mobile system at a position in front of said front bumpers and covering almost all the front half of said autonomous mobile system while shielding said front bumper therewith.

3. An obstacle detection device, adapted for detecting whether an autonomous mobile system is colliding with an obstacle, comprising:

an insulating plate with an insulating plate's first end and an insulating plate's second end;

a first conducting part with a first conducting part's first end and a first conducting part's second end;

a second conducting part with a second conducting part's first end and a second conducting part's second end;

a control unit;

a first reed connecting said insulating plate's first end to said first conducting part's first end;

a second reed connecting said insulating plate's second end to said second conducting part's second end;

a wire connecting said first conducting part's second end, said second conducting part's first end, a voltage source, and said control unit; and a buffering plate, arranged in front of said autonomous mobile system;

wherein, as the autonomous mobile system collides with the obstacle, a reactive force will be generated to press said buffering plate and then to said first reed while causing the two conducting parts to contact with each other so as to enable an electrical conduction for issuing an electrical signal to the control unit of the autonomous mobile system and thus enabling the autonomous mobile system to react with respect to the collision.

4. The obstacle detection device of claim 3, wherein said buffering plate is arranged on the autonomous mobile system at a position in front of said front bumpers and covering almost all the front half of the autonomous mobile system while shielding said front bumper therewith.

5. The obstacle detection device of claim 4, wherein by the disposition of the buffering plate, when the autonomous mobile system fitted with at least two said obstacle detection devices is colliding with an obstacle at its right front end, the buffering plate will be pressed by the collision and thus exert a larger reaction force on the one front bumper that is disposed closer to the right front end of the autonomous mobile system and a smaller reaction force on the one front bumper that is disposed closer to the left front end of the autonomous mobile system, so that the control unit will direct the autonomous mobile system to turn left; and when the autonomous mobile system collides with an obstacle at its left front end, the front bumper at the left will subject to a larger reaction force from the buffering plate comparing to the smaller force exerted on the right front bumper so that the control unit will direct the autonomous mobile system to turn right; and when the autonomous mobile system collides with an obstacle head on, the two front bumpers will receive almost the same reaction forces from the buffering plate so that control unit will direct the autonomous mobile system to back off for a specific distance.

6. The obstacle detection device of claim 4, wherein the front bumper is formed in a manner selected from the group consisting: it is integrally formed with the buffering plate; it is attached directly to the buffering plate.

7. The obstacle detection device of claim 3, wherein the reaction performed by the autonomous mobile system in response to the collision is selected from a group consisting of: stopping the moving of the autonomous mobile system, and enabling the autonomous mobile system to turn and head in a random direction.

8. An obstacle detection device, adapted for detecting whether an autonomous mobile system is colliding with an obstacle, comprising:

a first conducting wire, connecting a first voltage source and a first resistor;

a second conducting wire, connecting a second voltage source and a second resistor;

a first spring, having two ends thereof respectively affixed to a front bumper and a frame of the autonomous mobile system;

a second spring, having two ends thereof respectively affixed to the front bumper and the frame of the autonomous mobile system;

a first limit switch, being arranged at the frame of the autonomous mobile system while connecting to two ends of the first conducting wire;

a second limit switch, being arranged at the frame of the autonomous mobile system while connecting to two ends of the second conducting wire; and a buffering plate, arranged on the autonomous mobile system at a position in front of said front bumper and covering almost all the front half of the autonomous mobile system while shielding said front bumper therewith;

wherein, as the autonomous mobile system collides with the obstacle, a reactive force will be generated by the first spring and the second spring to force two protrusions respectively arranged at the front bumper to press the first limit switch's reed and the second limit switch's reed so as to enable an electrical conduction of the limit switches and thus enable the limit switches to issue an electrical signal to a control unit of the autonomous mobile system for enabling the autonomous mobile system to stop moving backward or turn, and head in a random direction.

9. An obstacle detection device for detecting whether an autonomous mobile system is missing a step, comprising:
a frame;
a first base coupled to the frame;
a second base coupled to the frame;
a first conducting part;
a second conducting part;
a third conducting part;
a fourth conducting part;
a first spring;
a second spring;
a first telescopic rod with a first telescopic rod's first end and a first telescopic rod's second end, and said first telescopic rod is positioned within said first spring, wherein said first telescopic rod's first end and said first spring connect to the first base, said first telescopic rod's second end and said first spring connect the first conducting part, and said first conducting part connects to a first support rod and to a first roller, which said first support rod and said first roller is for the autonomous mobile system so as to be driven to move thereby;
a first sensing seat coupled to the second conducting part, being arranged on the frame and adjacent to said first conducting part, wherein the second conducting part is directly under the first conducting part;
a second telescopic rod with a second telescopic rod's first end and a second telescopic rod's second end, and said second telescopic rod is positioned within said second spring, wherein said second telescopic rod's first end and said second spring connect to the second base, said second telescopic rod's second end and said second spring connect to the third conducting part, and said third conducting part connects to a second support rod and to a second roller, which said second support rod and said second roller is for the autonomous mobile system so as to be driven to move thereby;
a second sensing seat coupled to the fourth conducting part, being arranged on the frame and adjacent to said third conducting part, wherein the fourth conducting part is directly under the second conducting part;
a first conducting wire connecting said first conducting part, said second conducting part, and a first voltage source;
a second conducting wire connecting said third conducting part, said fourth conducting part, and a second voltage source; and
a buffering plate, arranged on the autonomous mobile system at a position in front of said front bumper and covering almost all the front half of the autonomous mobile system while shielding said front bumper therewith;
wherein, as the autonomous mobile system misses a step enabling either the first roller or the second roller to hang in the air, the first telescopic rod or the second telescopic rod is to extend causing the first and second conducting parts to contact with each other, or the third and fourth conducting arts to contact with each other, so as to enable an electrical conduction for issuing an electrical signal to a control unit of the autonomous mobile system and thus enabling the autonomous mobile system to react with respect to the missing of step.

10. The obstacle detection device of claim 9, further comprising:
at least an idler wheel, each being arranged at a position behind the rollers of the autonomous mobile system in a manner that each of the at least one idler wheel is enabled to be raised/dropped corresponding to the extending/retracting of the telescope rod, thereby, when the autonomous mobile system is moving normally on the ground and the telescope rod is pressed to retract, each idle wheel is raised without contacting to the ground; and when the autonomous mobile system miss a step that cause the telescope rod to extend, each idle wheel will be dropped to the ground and is activated to rotate in reverse for saving the autonomous mobile system from the missing step by backing off the same.

11. The obstacle detection device of claim 9, wherein said first spring or said second spring is an article selected from a group consisting of a compression spring, a tension spring, a plate spring, and a torsion spring.

12. The obstacle detection device of claim 9, wherein the reaction performed by the autonomous mobile system can be one action from a group consisting of: enabling the autonomous mobile system to start moving backward, and enabling the autonomous mobile system to turn and head in a random direction.

13. The obstacle detection device of claim 9, wherein the first conducting part is separated from the second conducting part for breaking the electrical conduction as said first spring is being pressed by a pressing force, and the first conducting part is driven to contact with the second conducting part for enabling the electrical conduction as said first spring is relieved from the pressing force.

* * * * *